United States Patent [19]

Silbermann et al.

[11] Patent Number: 4,865,880
[45] Date of Patent: * Sep. 12, 1989

[54] SURFACE MODIFIED, U.V. STABILIZED, POLYVINYL CHLORIDE ARTICLE

[75] Inventors: Joseph Silbermann, Old Bridge; Michael Burchill, Cranbury, both of N.J.

[73] Assignee: M&T Chemicals Inc., Woodbridge, N.J.

[*] Notice: The portion of the term of this patent subsequent to Sep. 13, 2005 has been disclaimed.

[21] Appl. No.: 76,629

[22] Filed: Jul. 23, 1987

Related U.S. Application Data

[63] Continuation-in-part of Ser. No. 945,595, Dec. 23, 1986, Pat. No. 4,770,905, which is a continuation-in-part of Ser. No. 945,757, Dec. 23, 1986.

[51] Int. Cl.⁴ .............................................. B05B 5/00
[52] U.S. Cl. .................................. 427/160; 427/331; 427/336; 427/353; 427/430.1; 427/434.2
[58] Field of Search ............... 428/216, 334, 578, 500; 427/160, 434.2, 430.1, 331, 336, 353

[56] References Cited

U.S. PATENT DOCUMENTS 3,043,709 7/1962 Amborski ............................ 427/160
3,519,462 7/1970 Bristol et al. ........................ 427/160

FOREIGN PATENT DOCUMENTS 39037 11/1975 Israel .

OTHER PUBLICATIONS

Kutz, M. et al., Soc. Plast. Eng., Technical Papers, (1976), 22, pp. 511–512.

Primary Examiner—Janyce Bell
Attorney, Agent, or Firm—S. A. Marcus; W. Katz

[57] ABSTRACT

A surface modified, U.V. stabilized opaque polyvinyl chloride resin article and process for making same is described. The article includes a white pigment, such as titanium dioxide, in low amounts. The modified surface is substantially free of residual stabilizer and solvent, and its appearance and degree of surface perfection is substantially the same as an unmodified side of the article.

The process of the invention is characterized by the steps of immersing the polyvinyl chloride article is immersed in a suitable liquid media, then contacted with a solution of an ultraviolet light stabilizer in a suitable organic solvent, and residual stabilizer and solvent are displaced in situ, i.e. in a non-evaporative environment without contacting the air.

22 Claims, 2 Drawing Sheets

SURFACE MODIFIED, U.V. STABILIZED, POLYVINYL CHLORIDE ARTICLE

CROSS-REFERENCE TO RELATED PATENT APPLICATIONS

This application is in a continuation-in-part, copending U.S. patent application Ser. Nos. 945,565, now U.S. Pat. No. 4.770,905 and 945,757, both filed Dec. 23, 1986, by the same inventors, and assigned to the same assignee, as herein. The entire disclosures of these applications are incorporated by reference herein.

BACKGROUND OF THE INVENTION

1. Field of the Invention

This invention relates to U.V. stabilized polyvinyl chloride articles, and, more particularly, to polyvinyl chloride articles having a surface modified effectively with a U.V. stabilizer.

2. Description of the Prior Art

Titanium dioxide, which is a white pigment, has a dual function in polyvinyl chloride articles. The first function of titanium dioxide is to stabilize polyvinyl chloride against the adverse effects of U.V. radiation by absorbing, reflecting, dispersing or scattering the incident U.V. energy. The second function of titanium dioxide is to render the article opaque so that colored articles may be produced, if desired, by including colorants therein in an amount sufficient to overcome the white titanium dioxide present.

Unfortunately, the amount of titanium dioxide necessary for effective U.V. stabilization, about 12 phr, precludes deep coloration of such articles. In fact, only colored articles of pastel shades can be obtained; deep shades of brown, blue and maroon, for example, are not readily attainable. Accordingly, it would be advantageous to provide U.V. stabilized polyvinyl chloride articles containing titanium dioxide in amounts only necessary to render the article opaque.

Of course, the use of low concentrations of titanium dioxide is accompanied by the loss of its U.V. stabilization function. Therefore, for low titanium dioxide articles, it is necessary to provide an alternative means of U.V. stabilization for such articles. Since titanium dioxide is such a cheap raw material, it is uneconomical to substitute an effective, but high priced organic U.V. stabilizer, such as a benzophenone or benzotriazole, in place of titanium dioxide. Furthermore, since photodegradation is known to be a surface phenonenon, bulk incorporation of such organic U.V. stabilizers is inefficient because the stabilizer is present substantially in the interior of the article, where it does not act to prevent surface photodegradation.

For these reasons, surface treatments of polyvinyl chloride articles containing titanium dioxide have been proposed to provide effective and economical U.V. stabilization for polyvinyl chloride resins. These prior art surface treatments are based on the ability of various organic solvents to swell the resin so that a solution of the U.V. stabilizer can be directed into the surface regions of the article, where protection is desired. However, none of these surface treatments have been very successful commercially.

For example, Jochanan, in Israeli Patent No. 39037, published Nov. 10, 1975, entitled "U.V. - and Oxidation-Proof Products from Organic Plastics and their Manufacture", describes various methods of applying a solution or suspension of a U.V. absorber onto the surface of a plastic sheet containing titanium dioxide. The methods disclosed by Jochanan include dipping the resin sheet into a solution of the stabilizer, or spraying, brushing, roller-printing or curtain-coating the solution onto the sheet. With such methods, however, a large amount of residual stabilizer and solvent is left on the surface of the article, and the modified surface is observed to be streaky, hazy, and has runs or pockmarks thereon.

Other attempts at effective surface modification of polyvinyl chloride are described by Katz, et al, in the "Proceedings of the A.C.S. Div. of Org. Coatings and Plastics" 36, (1) p. 202–205(1976); Katz, et al., Soc. Plast. Eng., Tech. Papers (1976)[22], 511–512; U.S. Pat. Nos. 3,043,709; 3,297,462; 3,519,462, 3,783,011; 3,892,889; 4,146,658; 4,323,597; 4,349,067; and Belgium Pat. No. 612,206. However, none of these disclosed processes have provided useful surface modified, U.V. stabilized, opaque polyvinyl chloride resin articles, for use, for example, in residential siding, which application requires particularly effective protection from the weathering effects of sunlight, and an appearance and degree of surface perfection which is acceptable to the public.

Accordingly, an object of the present invention is to provide a surface modified, U.V. stabilized polyvinyl chloride resin article containing titanium dioxide in an amount sufficient to render it opaque.

Another object of the invention is to provide a resin sheet article wherein the modified surface is substantially free of residual stabilizer and solvent materials, and the appearance and degree of surface perfection of the modified side is substantially the same as that of the unmodified side of the sheet.

Another object herein is to provide such resin articles wherein the amount of stabilizer within the modified surface region of the sheet is at least 0.3 g/m$^2$ of the surface area of the sheet, and, most preferably, 0.5 to 10.7 g/m$^2$, where the surface region is defined as a depth extending up to about 200 microns from the surface, and at least 70% of this stabilizing amount is present within the first 100 microns of the surface region.

Still another object of the invention is to provide the desired U.V. stabilization within the surface region with polyvinyl chloride resin articles containing titanium dioxide in an amount of at least 0.5 phr, preferably less than about 8 phr, and, most preferably, about 1 to 6 phr.

Yet another object herein is to provide a method of making such PVC articles in which the treated PVC sheet is protected from the atmosphere during formation of the surface modified article.

These and other objects, features and advantages of the present invention will be readily apparent from the following detailed description thereof, which is to read in connection with the accompanying drawings, in which:

SUMMARY OF THE INVENTION

What is described herein is a surface modified, U.V. stabilized, polyvinyl chloride resin article containing titanium dioxide. The modified surface is substantially free of residual stabilizer and solvent used therewith, and its appearance and degree of surface perfection is substantially unaffected by the modification and thereby appears the same as that of an unmodified side of the sheet.

The amount of titanium dioxide in the article suitably is at least 0.5 phr, preferably less than about 8 phr, and, most preferably, about 1 to 6 phr.

The surface region of the sheet extends for a depth of up to 200 microns from the surface and is fully modified in situ with a stabilizing amount of a ultraviolet light stabilizer, suitably with at least 0.3 g/m$^2$ of the surface area of the sheet, and preferably about 0.5 to 10.7 g/m$^2$. At least 70% of this stabilizing amount is present within the first 100 microns of the surface region.

The U.V. stabilized resin article is made by a continuous process in which the polyvinyl chloride article is immersed in a suitable liquid media, the surface of the immersed body contacted through the liquid with a solution of vent, and residual stabilizer and solvent are displaced from the modified surface in situ, that is, without contacting the outside atmosphere, i.e. a non-evaporative environment.

DETAILED DESCRIPTION OF THE INVENTION

The article of the present invention is made by first blending a suitable amount of titanium dioxide with polyvinyl chloride resin. The resultant mixture is processed into a shaped body, such as a sheet or other useful structure. For illustrative purposes only, the following description will be made by reference to a sheet article, which is intended to include such forms as a film, strip, ribbon, bar, rod, etc. but it will be understood that other shaped articles which are apparent to those skilled in the art also may be made herein.

The amount of titanium dioxide suitable for incorporation with the polyvinyl chloride resin is at least 0.5 phr. Preferably, an amount less than about 8 phr is used, and, most preferably, less than about 1 to 6 phr.

As will be demonstrated hereinafter, the surface modified article of the invention can provide effective U.V. stabilization with such low amounts of titanium dioxide. In fact, unexpectedly, at a given level of modification with U.V. stabilizer in the surface region of the article the effectiveness of such U.V. stabilization actually is enhanced when smaller amounts of titanium dioxide are present in the article.

Figure 1:
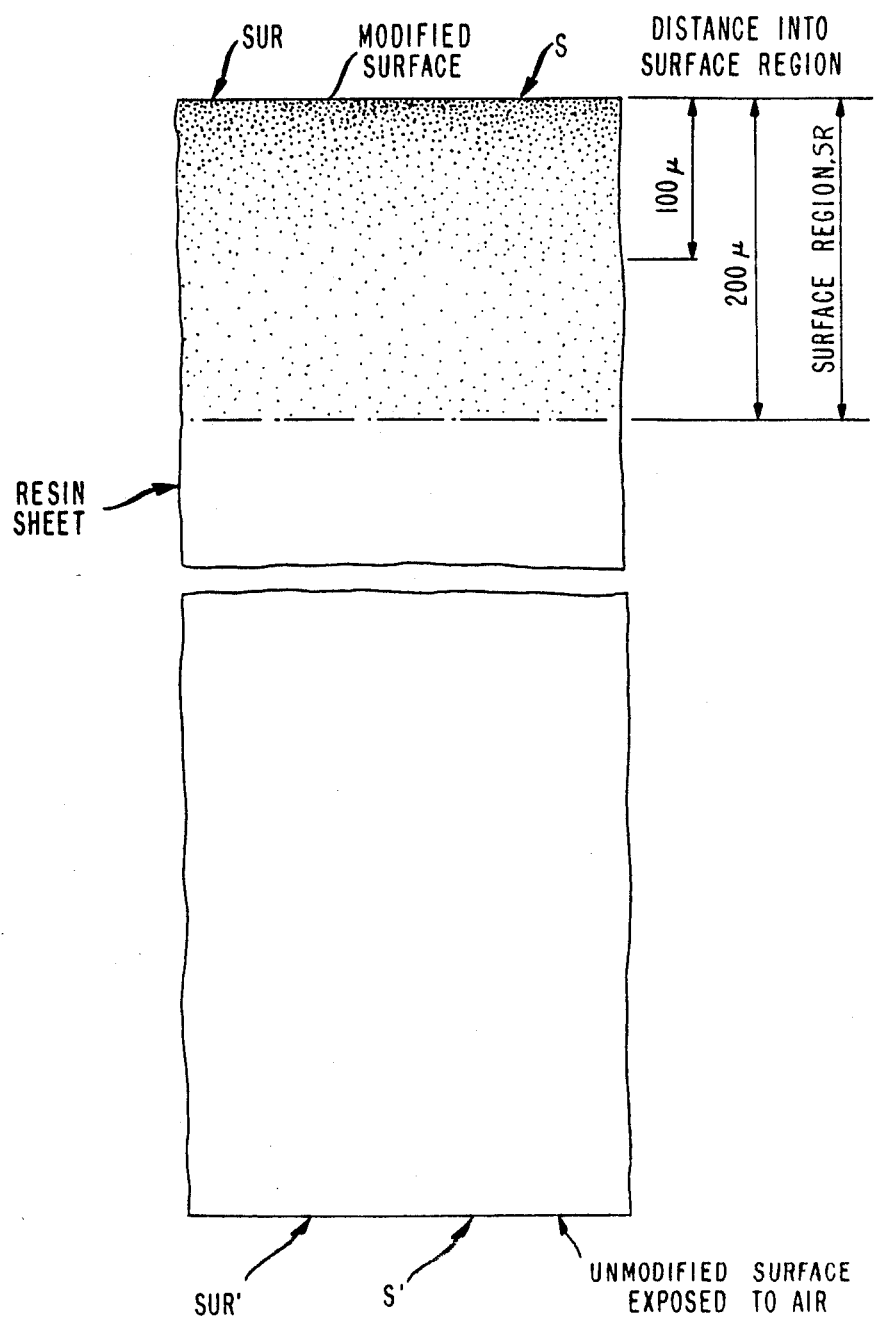
FIG. 1 shows the U.V. stabilized article of the present invention.

Referring now to the drawings, FIG. 1 shows the U.V. stabilized article of the present invention. The article includes a resin body, such as a sheet or other shaped structure thereof, of polyvinyl chloride or another polymeric resin. The article has sides S and S', both of which are exposed to the air. Each exposed side has respective surfaces SUR and SUR'. Side S has a surface region SR extending from surface S to a depth of up to about 200 microns into said sheet. Surface region SR is modified with a stabilizing amount of a U.V. stabilizer material, which is an amount of at least 0.3 g/m$^2$ of the surface of the sheet, and preferably about 0.5 to 10.7 g/m$^2$ thereof. 70% or more of the stabilizer is found within the first 100 microns of the surface region. Stabilizer is substantially absent in the interior or bulk of the sheet, and surface SUR also is substantially free of residual stabilizer.

The uniformity, appearance and degree of surface perfection of the modified surface SUR is unaffected by the surface modification process and is substantially the same as that of the unmodified surface SUR'. Surface perfection is defined as a surface which is non-tacky and nonstreaking, and which retains its original shape and hardness after being modified with stabilizer.

The shaped resin body itself is obtained by general mechanical processing techniques known to those skilled in the art. Illustrative of such mechanical operations are compression, injection, jet, transfer molding, vacuum forming, extrusion and the like. Such bodies can range from flexible sheets to rigid structural members. However, the invention is aimed particularly at articles which are plagued by U.V. degradation accompanying outdoor weathering, and, particularly, PVC residential siding.

Accordingly, polyvinyl chloride is the preferred resin for the article of the invention. However, other resins susceptible to impregnation with U.V. stabilizers also are suitable.

Figure 2:
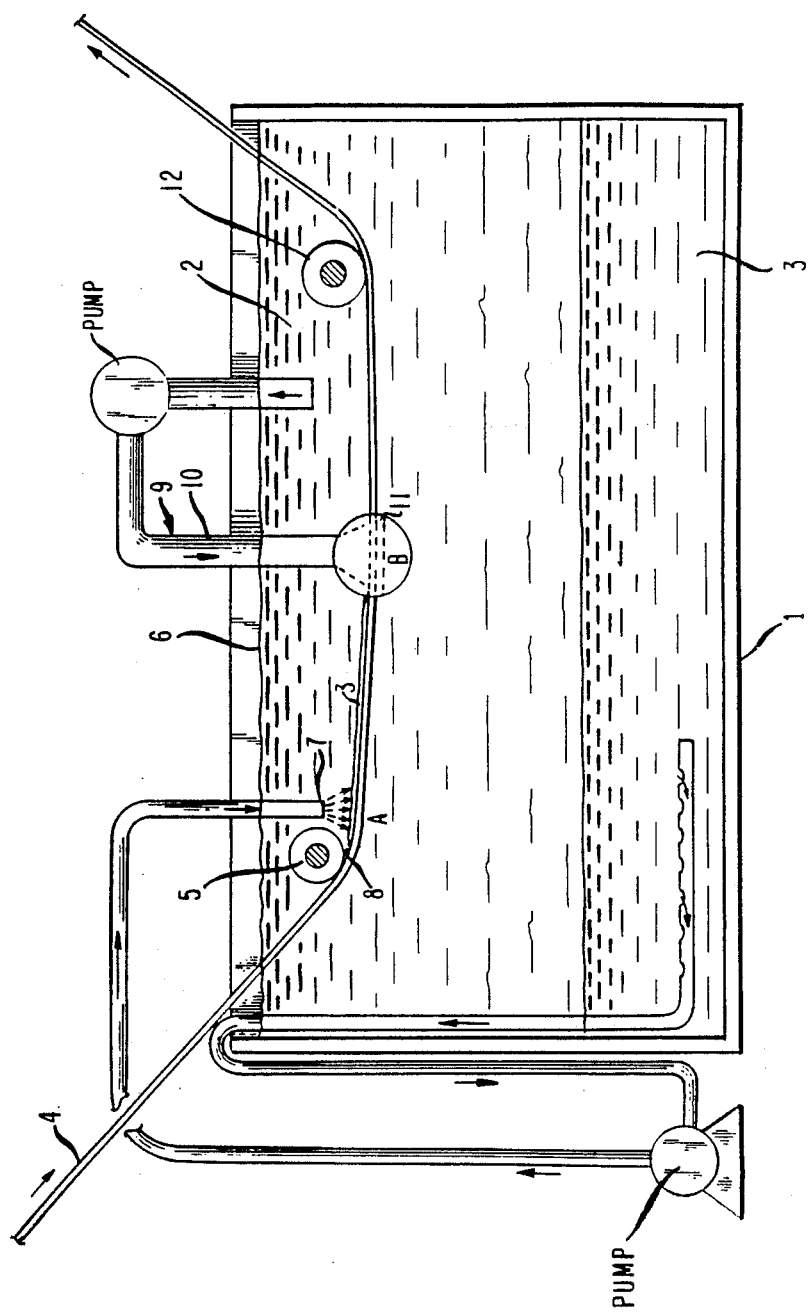
FIG. 2 is a schematic representation of an apparatus suitable for making the U.V. stabilized article of FIG. 1 by a continuous process.

Referring now to FIG. 2, there is shown schematically an apparatus useful for making the U.V. stabilized resin article of the invention. In general, the method employed with such apparatus comprises immersing a resin sheet in a suitable liquid media, contacting the surface of the immersed sheet to be modified through the liquid with a solution of an ultraviolet light stabilizer in a suitable organic solvent, and displacing residual stabilizer and solvent from the treated surface in situ. Suitable solvents are those which swell the resin effectively, are immiscible with the organic solvent and are non-aggressive towards the resin.

The preferred in situ method of making the U.V. article of the invention is a continuous process which comprises immersing the resin sheet in an aqueous liquid, e.g. water, flowing a solution of an ultraviolet light stabilizer in a resin-swellable organic solvent through the water into contact with the surface of the sheet to be modified while it is immersed in the water, thereupon causing the surface contacted to swell sufficiently to allow the stabilizer solution to fully penetrate into the surface region of the sheet, and then displacing residual stabilizer and solvent from the modified surface in situ, preferably with said aqueous liquid.

After contacting the surface of the sheet, excess stabilizer solution falls or rises from the thus-treated surface. The particular direction will depend on the respective densities of the liquid and organic solvent employed. It is preferred to use liquids such as water or aqueous solutions thereof, and organic solvents having a density greater than water or such solutions. Accordingly, the preferred arrangement of liquid and solution is a two-layer system, where water is the upper layer, and the solution of stabilizer in the organic solvent is the lower layer.

The organic solvent is selected among solvents which do not mix well with the liquid media; otherwise, the solvent would not reach the resin sheet but would simply dissolve therein. Another consideration in choice of solvent is an empirical one, namely, the desire to impregnate the resin article with the U.V. stabilizer within a minimum contact time. This property depends on a number of factors, particularly the ability of the solvent to effectively swell the resin surface.

The apparatus shown in FIG. 2 is a two-layer system in which the liquid phase is the upper layer and the stabilizer solution is the lower layer. The resin sheet is oriented in an immersed state in the upper layer. In operation of such a two-layer process in a continuous manner, the stabilizer solution is pumped from the lower layer and applied over the sheet from beneath the aqueous upper layer. Excess stabilizer solution then falls off the sheet by gravity to return to the lower layer. The organic solvent in the stabilizer solution is blocked from evaporating into the atmosphere by the blanket of liquid above it, which is advantageous for producing modified surfaces having a high degree of surface perfection, and for ecological reasons.

The apparatus of FIG. 2 includes a tank 1 about ¾ full with water 2 as the upper layer. Stabilizer solution 3 of U.V. absorber in an organic solvent, e.g. methylene chloride, is present as the lower layer therein. A continuous resin strip 4 of extruded polyvinyl chloride, for example, is fed through the upper layer at a predetermined rate from below roller 5, which is roller positioned below surface 6 of the water.

Further ahead of roller 5, in what is referred to herein as the "application zone" A, a series of applicator nozzles 7 are oriented below the surface level 6 of the water with their orifices directed towards one surface of strip 4. The applicator nozzles continuously direct a stream of stabilizer solution 3 over the upper surface 8 of the moving resin strip 4. The thus-applied stabilizer solution remains on the surface of the strip whereupon the surface region is modified effectively with stabilizer.

Downstream of the applicator zone is a "displacement zone" B, in which residual stabilizer solution is removed in situ from the thus-treated surface of the strip. The term "in situ" means that the displacement step also is carried out without exposing the treated surface to the ambient atmosphere; rather, the treated surface remains under water where the solvent cannot evaporate. Such evaporation of solvent is particularly undesirable because it would leave streaks of solid stabilizer material thereon.

In the displacement zone, a jet element 9 directs a spray of displacing liquid, preferably water 2, at a pressure sufficient to displace residual stabilizer solution from the treated surface of the strip. Jet element 9 comprises a hollow, perforated rod 10 terminating in slit 11 through which strip 4 is conveyed into the displacement zone.

The length of time the stabilizer solution remains on the surface of the sheet during passage from the application zone to the displacement zone is referred to herein as the "contact time" of the process.

A second roller 12 is located ahead of the displacement zone and below the level of the water to accept the thus-treated resin strip after it leaves the displacement zone. Variable speed nip roller pullers (not shown) are positioned outside the tank to move the strip at a predetermined speed through and out of the tank, where it can be stored on a suitable take-up roll.

The equipment and procedure described above also is applicable to organic solvents having a density which is less than 1, e.g. ethyl acetate, 2-pentanone, 3-pentanone and the like. For such organic solvents, the stabilizer solution would constitute the top layer and water the bottom layer. The stabilizer solution then would rise in the water to contact the resin sheet from the underside, thereafter passing upwardly.

The invention will be described now with the reference to the following examples, in which the U.V. stabilizer article of the present invention is prepared using the apparatus and system of FIG. 1.

Protection of the article against deterioration by U.V. light under these process parameters is indicated in the graph as changes in yellowness index (YI), or delta YI values. The $\Delta YI$ values were determined by accelerated U.V. exposure tests, according to ASTM G 53-84. The change from initial to final $\Delta YI$ is designated $\Delta YI$. A $\Delta YI$ value of zero (or minus) indicates minimal or complete absence of yellowing; positive $\Delta YI$ values evidences increasing yellowness caused by U.V. exposure.

EXAMPLE 1

Preparation of U.V. Stabilized Article of Invention

A solution of 10% by weight of Cyasorb U.V. 5411 stabilizer (a trademark of American Cyanamid Co.) in methylene chloride is applied onto the upper surface of a horizonatally supported, moving polyvinyl chloride resin strip containing 2 phr titanium dioxide (rutile form) immersed in water at 16° C. The white, opaque PVC strips are fabricated from a blend of vinyl chloride homopolymer (Geon 103EP F-76 from B.F. Goodrich Company; Int. Visc.=0.92 by ASTM D 1243) containing 5.0 phr of an impact modifier, 1.0 phr of a processing aid, 2.0 phr of calcium stearate lubricant, and 1.5 phr of tin mercaptide stabilizer.

The applicator nozzles are directed vertically towards the upper surface of the sheet from a position beneath the water level. Thereupon stabilizer is absorbed into the surface region of the upper surface of the sheet and excess solution falls to the bottom of the tank. The contact time is 24 seconds. Downstream of the applicator zone, a jet of water is applied to the treated surface to displace residual stabilizer and solvent still remaining on the treated surface. The U.V. stabilized article then is exited from the tank and is wound onto a take-up roll.

EXAMPLE 2

Structure of U.V. Stabilized Article of Invention

The U.V. stabilized article prepared in Example 1 is microtomed into 20 micron sections extending to a total depth of up to about 200 microns from the surface. The amount of U.V. stabilizer present in each of these sections is determined by means of high pressure liquid chromatography (HPLC) analysis. The results are given in Table I below.

TABLE I

| Concentration Profile of Stabilizer in Surface Region and Bulk of Sheet | | | | |
|---|---|---|---|---|
| Section (microns) | % Stabilizer in Section | Amount of Stabilizer in section g/m$^2$ | Total Stabilizer at Given Depth (g/m$^2$) | % of Total Stabilizer at Given Depth |
| 0–20 | 3.78 | 1.05 | | 35 |
| 20–40 | 2.32 | 0.65 | | 57 |
| 40–60 | 1.36 | 0.38 | | 70 |
| 60–80 | 1.05 | 0.30 | | 80 |
| 80–100 | 0.7 | 0.20 | 2.6 | 87 |
| 100–120 | 0.4 | 0.11 | | 90 |
| 120–140 | 0.2 | 0.06 | | 92 |
| 140–160 | 0.1 | 0.03 | | 94 |

TABLE I-continued

| | | | | |
|---|---|---|---|---|
| 160–180 | 0.1 | 0.03 | | 96 |
| 180–200 | 0.1 | 0.03 | 3.0 | 99 |

UV Stabilizer Solution

Stabilizer

M.W. = 323.4

Cyasorb UV 5411 (Trademark of the American Cyanamid Corp.)
Chemical Name: 2(2'-hydroxy-5't-octylphenyl)-benzotriazole Solution
10% by wt./vol. of stabilizer in methylene chloride solvent.

Process Conditions
Temperature-16° C.
Contact time-26 sec.
Sheet speed-1.5 ft./min.
Thickness of PVC Sheet-1300 microns
Composition of PVC Sheet-2 phr $TiO_2$ The test results in Table I show that 3.0 g/m² of the stabilizer is deposited within the surface region o one side of the sheet, i.e. within a depth of up to 200 microns from the surface, and 87% of this amount, or 2.6 g/m², is present within the first 100 microns of the surface region. Within the interior or bulk of the sheet, i.e. from 200 to 1300 microns (the thickness of the sheet), substantially no stabilizer is present. Furthermore, residual stabilizer and solvent (less than 1% of each) are substantially absent on the modified surface of the sheet. The surface of the resultant product is uniform, non-tacky, has no streaks of solid material thereon, and substantially retains its original planarity and hardness.

EXAMPLE 3

Properties of U.V. Stabilized Articles of Invention

Following the procedures of Examples 1 and 2, various concentrations of stabilizer solutions were applied onto the upper surface of the PVC sheet for predetermined contact times. Methylene chloride was used as the solvent. Table II shows the amount of stabilizer incorporated into the surface region of the resin sheet as a function of both stabilizer concentration and contact time.

TABLE II

Effect of Concentration of Stabilizer and Contact Time on Amount of Stabilizer Incorporated into Surface Region of Sheet and its U.V. Stability

| Sample No. | Stabilizer Conc. (% wt./vol) | Contact Time (sec.) | Total Amount of Stabilizer (g/m²) | ΔYI U.V. exposure (10 weeks) |
|---|---|---|---|---|
| 1 | 1 | 120 | 1.8 | 8.4 |
| 2 | 3 | 15 | 3.0 | 6.0 |
| 3 | 3 | 30 | 3.9 | 7.1 |
| 4 | 3 | 45 | 4.6 | 6.7 |
| 5 | 3 | 60 | 4.5 | 6.3 |
| 6 | 3 | 75 | 4.6 | 7.1 |
| 7 | 3 | 90 | 5.2 | 5.9 |
| 8 | 3 | 105 | 5.5 | 6.5 |
| 9 | 3 | 120 | 5.7 | 5.1 |
| 10 | 5 | 15 | 5.3 | 6.9 |
| 11 | 5 | 30 | 5.9 | 6.6 |
| 12 | 5 | 45 | 6.6 | 5.9 |
| 13 | 5 | 60 | 7.7 | 5.4 |
| 14 | 5 | 75 | 8.0 | 5.3 |
| 15 | 5 | 90 | 8.2 | 5.0 |
| 16 | 5 | 105 | 8.4 | 6.8 |
| 17 | 5 | 120 | 9.6 | 5.7 |

TABLE II-continued

Effect of Concentration of Stabilizer and Contact Time on Amount of Stabilizer Incorporated into Surface Region of Sheet and its U.V. Stability

| Sample No. | Stabilizer Conc. (% wt./vol) | Contact Time (sec.) | Total Amount of Stabilizer (g/m²) | ΔYI U.V. exposure (10 weeks) |
|---|---|---|---|---|
| Control | 0 | 0 | 0 | >40 |

The results in Table II show that application of stabilizer solution having a concentration of 1 wt. % for 120 sec. provides an amount of stabilizer in the surface region of the sheet which affords excellent protection against U.V. light. At concentrations up to 5 wt. % of stabilizer, and for contact time up to 2 min., even more effective U.V. protective is achieved.

EXAMPLE 4

Following the procedures of Examples 1-3, and using 0.5 to 8 phr titanium dioxide in the polyvinyl chloride resin sheet, surface modified articles are obtained which provide effective U.V. stabilization when subjected to weathering conditions for an extended period of time.

EXAMPLE 5

Polyvinyl chloride resin strips are prepared with 2 and 12 phr of titanium dioxide. Blue pigment then is added space to obtain a blue colored, opaque PVC strip. A process similar to Example 1 is followed to provide U.V. stabilized, blue colored, opaque PVC articles which then are weathered. The results of these tests are shown in Table III below.

This data shows that after 9 and 12 months, distinct differences appear which demonstrates that a surface modified article with 2 of phr titanium dioxide weathers better than one with 12 phr of titanium dioxide.

TABLE II

| Color | Amount of Titanium Dioxide (phr) | Amount of Stabilizer (UV-5411) (g/m²) | Color Level ΔE* | | | |
|---|---|---|---|---|---|---|
| | | | 3 | 6 | 9 | 12 |
| | | | (months) | | | |
| Blue | 2 | 2.67 | 1.7 | 1.4 | 2.1 | 3.10 |
| Blue | 2 | 0 | 3.7 | 11.9 | 17.7 | 17.00 |
| Blue | 12 | 2.67 | 4.5 | 3.3 | 5.8 | 8.10 |

TABLE II-continued

| Color | Amount of Titanium Dioxide (phr) | Amount of Stabilizer (UV-5411) (g/m²) | Color Level ΔE* | | | |
|---|---|---|---|---|---|---|
| | | | 3 | 6 | 9 | 12 |
| | | | (months) | | | |
| Blue | 12 | 0 | 5.2 | 6.4 | 20.1 | 14.20 |

*Changes in color level, after weathering, are expressed as E, an energy value conventionally used incolor techology to describe color intensities.

Twelve month weathering tests also were conducted on the blue plaques in Arizona and Florida. The results are shown in Table I, which indicates that the 2phr titanium dioxide articles are superior to those containing 12 phr titanium dioxide.

TABLE IV

| Amount of Titanium Dioxide (phr) | Amount of Stabilizer (UV-5411) (g/m²) | Color Level ΔE (12 months) |
|---|---|---|
| Arizona | | |
| 2 | 0 | 41.6 |
| 2 | 2.67 | 12.8 |
| 12 | 0 | 31.2 |
| 12 | 2.67 | 20.1 |
| Florida | | |
| 2 | 0 | 26.1 |
| 2 | 2.67 | 7.5 |
| 12 | 0 | 16.6 |
| 12 | 2.67 | 10.6 |

White opaque PVC sheets were prepared in a manner similar to Example 1 at titanium dioxide loadings of 0, 2, 3 and 4 phr. The se sheets were treated with 3% Cyasorb UV-5411 solution in methylene chloride for contact times ranging rom 15 to 120 seconds, displaced with water and air dried at room temperature. These test samples then were exposed according to the procedure of ASTM G 53-84, designated QUV, which is a combined UV radiation/water condensation accelerated weathering test. The delta YI values were obtained over a period of 22 weeks for samples treated in stabilizer solution for 120 seconds.

The results indicate that, at 2 phr titanium dioxide, the delta YI values increase up to a period of 9 weeks and then start leveling off. At 3 phr titanium dioxide there is an increase of delta YI values for about 14 weeks and then a leveling off. At 4 phr titanium dioxide the increase of delta YI values was more gradual than for the 2 or 3 phr samples; however, the delta YI values for the period of about 14–22 weeks were roughly comparable. The 12–22 week data are shown in Table V below.

TABLE V

| Titanium Dioxide* (phr) | Amount of Stabilizer UV-5411 (g/m²) | ΔYI | | | | | |
|---|---|---|---|---|---|---|---|
| | | 12 | 14 | 16 | 18 | 20 | 22 |
| | | (weeks) | | | | | |
| 2 | 0 | >40 | | | 1.75 | −0.06 | 0.23 |
| 2 | 0 | >40 | | | | | 0.36 |
| 2 | 3.03 | 6.51 | 7.08 | 7.38 | 7.37 | 7.24 | 7.45 |
| 2 | 5.70 | 5.11 | 5.87 | 5.95 | 6.77 | 6.68 | 6.40 |
| 3 | 3.21 | 6.67 | 6.95 | 7.31 | 8.04 | 8.22 | 7.80 |
| 3 | 6.06 | 6.87 | 6.68 | 7.00 | 8.32 | 7.37 | 6.51 |
| 4 | 5.52 | 6.10 | 6.12 | 6.46 | 7.38 | 6.95 | 7.59 |
| 4 | 6.41 | 6.03 | 6.30 | 5.78 | 6.57 | 6.40 | 6.50 |

(*)—rutile form.

EXAMPLE 7

As in Example 6 above, samples were prepared with titanium dioxide loadings of 0, 2, 3, and 4 phr. These samples received both 30 and 60 second treatments with 3% Cyasorb UV-5411 solution in methylene chloride and were subjected to long term weathering in Florida for 3 to 6 months (45 degrees southern exposure).

The delta YI values obtained on these samples are presented in Table VI below which demonstrate the efficacy of 2, 3 and 4 phr of titanium dioxide in conjunction with surface U.V. stabilization in imparting weather stability. Negative delta values merely indicate bleaching of the samples making less yellow (whiter) than the initial values.

TABLE VI

| | | Florida Exposure | | | |
|---|---|---|---|---|---|
| Color | Titanium Dioxide (phr) | UV Stabilized | YI (initial) | ΔYI | |
| | | | | 3 | 6 |
| | | | | (months) | |
| (b) | 2 | No | 8.2 | 1.2 | 3.1 |
| (b) | 2 | Yes | 8.2 | −2.0 | −3.0 |
| (b) | 3 | No | 8.2 | 0.4 | 3.2 |
| (b) | 3 | Yes | 8.2 | −1.8 | −2.7 |
| (b) | 4 | No | 7.8 | −0.4 | 1.9 |
| (b) | 4 | Yes | 7.8 | −1.6 | −2.1 |
| (c) | 3 | No | 8.2 | 0.6 | 5.7 |
| (c) | 3 | Yes | 8.2 | — | −0.6 |

(b) White samples; UV stabilizer contact time = 60 secs.
(c) White samples; UV stabilizer contact time = 30 secs.

As described, the preferred liquid media in the method used herein is water or an aqueous solution or emulsion thereof. Other liquids, however, can be used as long as they are "incompatible" with the organic solvent. The term "incompatible" is defined herein to mean a liquid having a solubility of no more than about 15 percent by weight in the organic solvent and at ambient temperature and pressure. Such liquids include alkanols and other water miscible liquids.

Similarly, the solvent in the stabilizer solution should be "liquid-immiscible solvent", which also is defined as a solubility in liquid at ambient temperature and pressure of no more than about 15 per cent by volume.

Accordingly, organic solvents suitable for use herein include water-immiscible organic solvents, as for example, halogenated hydrocarbons having up to six, preferably three, carbon atoms in the chain; ketones, both aliphatic and cycloaliphatic; aliphatic esters and the like. Representative halogenated hydrocarbons include methylene chloride, chloroform, 1,2-dichloroethane, 2-chloro-2-methylpropane and like chlorinated hydrocarbons. Exemplary ketones are 2-pentanone, 3-pentanone, 2-hexanone, 2,4-pentanedione and the like. Suitable ethers include diethyl ether, dipropyl ether, dimethoxy ethane, furan, tetrahydropyran and the like. Mixtures of mutually miscible organic solvents can also be used. The preferred organic solvents are methylene chloride, 1,2-dichloroethane, ethyl acetate, 2-pentanone and 3-pentanone, and mixtures of these solvents.

Suitable U.V. stabilizers include the following commercially available materials:

Cyasorb U.V. 9: 2-hydroxy-4-methoxybenzophenone (Trademark of American Cyanamid)

Cyasorb U.V. 531: 2-hydroxy-4-n-octoxybenzophenone (Trademark of American Cyanamid)

Cyasorb U.V. 541: 2(2,-hydroxy-5'-t-octylphenyl)-benzotriazole (Trademark of American Cyanamid)

Tinuvin P: 2(2'hydroxy-5'-methylphenyl)benzotriazole (Trademark of Ciba-Geigy)

Tinuvin 326: 2-(3't-butyl-2'-hydroxy-5'-methylphenyl)-5-chlorobenzotriazole (Trademark of Ciba-Geigy)

Sanduvor VSU: 2-ethyl-2-ethoxyanilide (Trademark of Sandoz Corp.)

Tinuvin 144 and 770: hindered amine light stabilizers (Trademark of Ciba Geigy for HALS)

Irgastab 2002: a nickel phosphate (Trademark of Ciba-Geigy)

The following is a partial list of these and other benzophenones and triazoles which are suitable U.V. stabilizers for use herein, although salieylates, formamidines, oxanilides, benzoates, etc. may be used as well. 2,2'-dihydroxybenzphenone 2,2,4,4'-tetrahydroxybenzophenone 2,2'-dihydroxy-4,4'-dimethoxybenzophenone 2,2'-dihydroxy-4,4'-diethoxybenzophenone 2,2'-dihydroxy-4,4'-dipropoxybenzophenone 2,2'-dihydroxy-4,4'-dibutoxybenzophenone 2,2'-dihydroxy-4-methoxy-4'-ethoxybenzophenone 2,2'-dihydroxy-4-methoxy-4'-propoxybenzophenone 2-hydroxy-4,4',5'-trimethoxybenzophenone 2-hydroxy-4-ethoxy-4'-methylbenzophenone 2-hydroxy-4-ethoxy-4'-ethylbenzophenone 2-hydroxy-4-ethoxy-4'-propylbenzophenone 2-hydroxy-4-ethoxy-4'-methoxybenzophenone 2-hydroxy-4;4-diethoxybenzophenone 2-hydroxy-4-ethoxy-4'-propoxybenzophenone 2-hydroxy-4-ethoxy-4'-butoxybenzophenone 2-hydroxy-4-ethoxy-4'-chlorobenzophenone 2-hydroxy-4-ethoxy-4; -bromobenzophenone 2-(2'-hydroxy-5'-methylphenyl)benzotriazole 2-(2'-hydroxy-5'-t-butylphenyl)benzotriazole 2-(2'-hydroxy-3'-methyl-5-t'-butylphenyl)benzotriazole 2-(2'-hydroxy-5'-cyclohexylphenyl)benzotriazole 2-(2'-hydroxy-3',5'-dimethylphenyl)benzotriazole 2-(2'-hydroxy-5'-t-butylphenyl)-5-chlorobenzotriazole and 2-(2'-hydroxy-3'-di-t-butylphenyl)benzotriazole 2,2'-dihydroxy-4-methoxy-4'-butoxybenzophenone 2,2'-dihydroxy-4-ethoxy-4'-propoxybenzophenone 2,3'-dihydroxy-4,4'-dimethoxybenzophenone 2,3'-dihydroxy-4methoxy-4'-butoxybenzophenone 2,3'-dihydroxy-4,4,5'-trimethoxybenzophenone 2-hydroxy-4,4,5'-trimethoxybenzophenone 2-hydroxy-4,4,6'-tributoxybenzophenone 2-hydroxy-4-ethoxy-2,4'-dibutylbenzophenone 2-hydroxy-4-propoxy-4,6'-dichlorobenzophenone 2-hydroxy-4propoxy-4',6'-dibromobenzophenone 2,4-dihydroxybenzophenone 2-hydroxy-4-methoxybenzophenone 2-hydroxy-4-ethoxybenzophenone 2-hydroxy-4-propoxybenzophenone 2-hydroxy-4-butoxybenzophenone 2-hydroxy-4-methoxy-4'methylbenzophenone 2-hydroxy-4-methoxy-4'propylbenzophenone 2-hydroxy-4-methoxy-4'butylbenzophenone 2-hydroxy-4methoxy-4'-t-butylbenzophenone 2-hydroxy-4-methoxy-4'-chlorobenzophenone 2-hydroxy-4-methoxy-2'-chlorobenzophenone 2-hydroxy-4methoxy-4'-bromobenzophenone 2-hydroxy-4,4'-dimethoxybenzophenone 2-hydroxy-4,4'-dimethoxy-3-methylbenophenone 2-hydroxy-4,4'-dimethoxy-3-methylbenzophenone 2-hydroxy-4,4'-2'-ethylbenzophenone 2-hydroxy-acetophenone The preferred temperature for making the U.V. stabilized article of the present invention is ambient temperature. However, process temperatures lower and higher than ambient temperature may be used, if desirable. For example, the water solubility of certain useful organic solvents, e.g. ethyl acetate, decreases with increasing temperature. Thus, it may be advantageous to use process temperatures higher than ambient temperature for such solvents. Similarly, organic solvents which swell a particular resin only modestly at room temperature can be rendered quite effective for infusion of the requisite amount of stabilizer into the surface region of the resin by raising the treatment temperature.

Although the preferred embodiment of the stabilizer article herein has only one side of the article is modified with stabilizer, it is understood that both sides may be modified, if desired, by directing jets of stabilizer solution towards both surfaces of the resin sheet.

While titanium dioxide has been described herein as a suitable compound for rendering the resin body opaque, it will be understood that other inorganic metallic oxides, sulfates and carbonates may be used as well, such as antimony trioxide, magnesium oxide, silicon dioxide, zinc oxide, barium sulfate and calcium carbonate, which are suitable white pigments.

The invention is applicable also to resin article impregnated with additives other the U.V. stabilizers. For example, resins can be impregnated with such additives as anti-static agents, anti-oxidants, anti-block agents, dyes, slip additives, and the like.

Although the invention has been described in its preferred forms with a certain degree of particularity, it is understood that the present disclosure has been made only by way of example and that numerous changes can be made without departing from the spirit and the scope of this invention.

What is claimed is:

1. A process for producing a surface modified resin article which comprises applying a solution of U.V. stabilizer material in a solvent to a surface of a resin article which includes about 0.5 to about 8 phr of a white pigment therein selected from an inorganic metallic oxide, sulfate or carbonate, and displacing residual stabilizer and solvent from the thus-treated surface, both steps being carried out in an environment which is non-evaporative of said solvent.

2. A process according to claim 1 wherein both steps are carried out without allowing the resin article to contact the atmosphere.

3. A process according to claim 1 wherein said stabilizer is present within said surface in a stabilizing amount of at least 0.3 g/m$^2$ of said surface.

4. A process according to claim 1 wherein said stabilizer amount is about 0.5 to 10.7 g/m$^2$.

5. A process according to claim 1 wherein said resin is polyvinyl chloride.

6. A process according to claim 1 wherein said process is carried out in a continuous manner on a moving resin sheet.

7. A process according to claim 1 wherein said solvent is a volatile organic solvent.

8. A process according to claim 1 wherein said solvent is methylene chloride.

9. A process according to claim 1 wherein said displacing step is carried out by directing a jet of water against the treated surface.

10. A process according to claim 1 wherein said white pigment is at least one compound selected from an inorganic metallic oxide, sulfate or carbonate.

11. A process according to claim 10 wherein said compound is titanium dioxide.

12. A process according to claim 11 wherein said titanium dioxide is present in an amount of at least 0.5 phr.

13. A process according to claim 11 wherein said titanium dioxide is present in an amount of up to 8 phr.

14. A method of incorporating at least one ingredient into an article fabricated from a polymer containing about 0.5 to about 8 phr of a white pigment selected from an inorganic metallic oxide, sulfate or carbonate, which comprises immersing the article in a liquid and contacting the immersed article with a solution of the ingredient in a solvent, said liquid being one which is non-aggressive towards the article and immiscible with the solvent.

15. The method of claim 14 wherein the polymer is polyvinyl chloride, and the article is rendered opaque by including at least 0.5 phr titanium dioxide therein.

16. The method of claim 13 wherein said titanium dioxide is present in an amount of up to 8 phr.

17. The method of claim 14 wherein the liquid comprises an aqueous media.

18. The method of claim 17 wherein the aqueous media consists of water, or water and a water-miscible solvent.

19. The method of claim 14 wherein the solvent is methylene chloride.

20. The method of claim 14, wherein the ingredient is an ultraviolet light stabilizer, an antioxidant, or an antistat.

21. A continuous method of incorporating at least one ultraviolet light stabilizer in the surface region of an opaque article fabricated from polyvinyl chloride and including at least 0.5 phr and up to 8 phr titanium dioxide therein, which comprises the steps of:
   (a) transporting the article through an aqueous media;
   (b) contacting substantially only one surface of the article with a solution of the stabilizer in an organic solvent while article is being transported through the aqueous media, said media being one which is non-aggressive towards the article and immiscible with the solvent; and
   (c) displacing substantially any residual solution remaining on the contacted surface while avoiding escape of solvent into the atmosphere.

22. A continuous process for incorporating at least one ultraviolet light stabilizer in the surface region of an opaque sheet fabricated from polyvinyl chloride and including at least 0.5 phr and up to 8 phr of titanium dioxide therein, said surface region extending to a depth of up to about 200 microns, the amount of stabilizer incorporated in the surface region being at least 0.3 $g/m^2$ of the surface of the article, with at least 70% of such amount concentrated in the upper 100 microns of the surface region, comprising the steps of:
   (a) transporting the sheet substantially horizontally through an upper water layer, there being a methylene chloride solution containing 1 to 60 wt./vol. % of the stabilizer present as a layer beneath the water layer;
   (b) flowing the solution from the bottom layer through the upper water layer onto substantially only one surface of the sheet as the sheet is being transported through the water layer such that the solution is in contact with said surface for a period of time ranging from about 2 seconds to about two minutes; and thereafter
   (c) directing a jet of water onto the contacted surface of the sheet while said sheet remains in said water layer, thereby to displace any residual solution on such surface.

* * * * *